Dec. 15, 1964   C. E. CARR   3,161,235
METHOD FOR PREVENTING CHANNELING IN
HYDRAULIC FRACTURING OF OIL WELLS
Filed Oct. 14, 1960   2 Sheets-Sheet 1

INVENTOR.
CHARLES E. CARR
BY Dominik & Lazo
ATTORNEYS

INVENTOR.
CHARLES E. CARR
BY
Dominik & Lazo
ATTORNEYS

United States Patent Office 3,161,235
Patented Dec. 15, 1964

3,161,235
METHOD FOR PREVENTING CHANNELING IN HYDRAULIC FRACTURING OF OIL WELLS
Charles E. Carr, P.O. Box 419, Lawrenceville, Ill.
Filed Oct. 14, 1960, Ser. No. 62,767
13 Claims. (Cl. 166—29)

The present invention relates to a method for treating producing formations. The method contemplates the treatment of geological formations. While such treatment is normally of oil-bearing formations, treatment of water, gas and other formations may be accomplished. More specifically, the method relates to confining to a selected stratum or strata the materials employed in the treatment of such formations. One of the most important commercial advantages achieved by practicing the present invention is in the prevention of channeling or failure of bond between the casing-cement-formation relationship from occurring during pressure treatment of a geological formation.

This application is a continuation-in-part of application 37,709 filed June 21, 1960, now abandoned.

It is well known to promote oil production from oil-bearing formation by fracturing or acidizing the same. The fractures in the formation create drainage channels for the oil. The acid similarly creates drainage channels by dissolving soluble relatively impermeable materials. In fracturing operations, the well casing and surrounding cement, if there be any, is perforated adjacent the zone to be treated; an interval in the well adjacent the zone is isolated by appropriately spaced packers; and pressurized fluid—normally an oil or emulsion—is pumped into the isolated interval from whence it flows through the perforation and out into the formation where the pressure opens various drainage channels in the formation. Pressurized fluids are also employed in related processes such as acid treatment and the like. Oftentimes a sequence of pressurizing steps is employed.

The pressurizing is most effective in fracturing when the hydraulic fluid is directed into and confined or maintained in the formation to be fractured. Additionally, an advantageous economy of fracturing or hydraulic fluid is effected when such confinement is obtained. Unfortunately, faults are often present in the well structure and the surrounding formation that operate to cause channeling and/or draining off of the fluid. Worse, many of these faults direct the fluid into water-containing formations and result in admitting water into the oil-bearing formation, or into the well directly.

In this connection, a serious type of fault leading to water displacement and loss of fracturing fluid results from defective bonding or sealing between the casing and the well cement surrounding it, or between the well cement and the formation, or a combination of the two. Such faults can be particularly serious because, for example, the pressure drop is comparatively low for a flow path from the perforation along the casing or cement through the fault, thus leading to an unproductive well requiring extensive further treatment. Corrective measures are oftentimes difficult in that the fracturing operation is already completed before detecting the failure.

Broadly, the invention contemplates establishing in or adjacent to the oil-producing formation to be treated an annular sealing cavity adjacent the casing spaced from the location where treatment is to be introduced into the formation. The materials used are compatible with conventional treating materials. One example of the invention follows: The sealing cavity is established by severing the casing and cement and forming a cavity in the formation, all below the fracturing fluid zone of entrance; and filling the casing with a plugging agent to form a bed having an upper level between the sealing cavity and the zone of entrance. The necessary zone of entrance is prepared by suitably perforating the casing and by seating a packer or packers at suitable levels above the zone of entrance. It is preferred to completely sever the casing and cement at the sealing region, i.e. a 360° circular arc defines the cut made. It is also possible to perforate the casing, however, while completely severing the cement. When the treating fluid is applied under pressure to the zone of entrance, the plugging agent fills the annular sealing cavity. Pressuring is then applied, and the level of the plugging agent checked, to insure that the annular seal is completely effected. The hydraulic and/or hydrostatic pressure is also utilized to maintain the seal. Variations in the sequence of steps are possible, all to the end of establishing a sealing region that opposes or blocks flow through faults that occur exterior to the casing. Also, the invention is not limited to the type of plugging agent used, but includes any material flowable into confining or sealing relation with the formation responsive to pressure.

Occasionally some geological formations will have a stratum containing water or salt water that lies immediately above the oil-bearing zone. Such formations are found in Kansas. The present invention includes establishing a seal to prevent channeling of treating fluid into the upper one of these zones into the oil-bearing zone and ultimately into the well. The treatment is advantageously employed where a fault in the casing-cement-well bore joint would connect the oil-bearing zone with its overlying water-containing zone.

One manner of establishing a seal is discussed above. Another manner of establishing a seal for such an overlying stratum is to provide a liquid body in the well casing itself and then to establish a mass of sealing material floating on top of the liquid. The liquid level is adjusted so that the sealing material is positioned adjacent a cut made through the casing and into the surrounding formation sealing cavity, and above the location where treating material is to be introduced into the formation. By seating a packer to seal off the well bore above the floating mass and then applying fracturing pressure from below the floating mass, it is possible to drive a portion of the floating mass through the cut and into the sealing cavity and thereby establish a seal. The seal is advantageously maintained during fracturing and other treating operations by the pressure within the well casing urging the floating body out into sealing contact with the formation.

One object of the present invention is to provide a method for combatting pressure treatment problems arising from faults in casing-to-cement bonding and/or in cement-to-formation bonding. Another object is to provide a method of preparing the well for subsequent execution of a fracturing or acidizing operation. A further object is to provide a method of preparing the well and executing a treating operation whereby flow or channeling (through faulty bonds of the nature described) of the treating fluid is opposed, thereby maximizing the treatment obtained for the materials and energy applied.

One feature common to many of the previously known corrective techniques is that the action to be taken occurs after the problem arises, at a time when it is not convenient to take such action and after loss of fluid, water displacement, and related injuries have been suffered. A feature of the present invention is that prophylactic action can be taken beforehand.

Other objects, advantages and features will become apparent from the following description and the drawing wherein:

FIGURE 1 schematically represents a cased well with a tool therein severing the casing and well cement at a depth below that proposed for initiating fractures in an oil-bearing formation.

FIGURE 2 schematically represents a cased well undergoing perforation at the proposed fracture initiation depth and after completion of the operation of FIGURE 1.

FIGURE 3 schematically represents a cased well with a bottom packer and sand plug emplaced.

FIGURE 4 schematically represents a cased well after the operation of FIGURE 3 wherein the interval to be treated is isolated with an upper packer during or after the application of fracturing pressure.

FIGURE 5 schematically represents an alternative technique for opening the well casing at the respective depths of fracturing and sealing.

The invention is carried out with the use of conventional tools in an existing cased well. The drawings illustrate various stages in the process of preparing a well in accordance with the invention.

Figure 1:
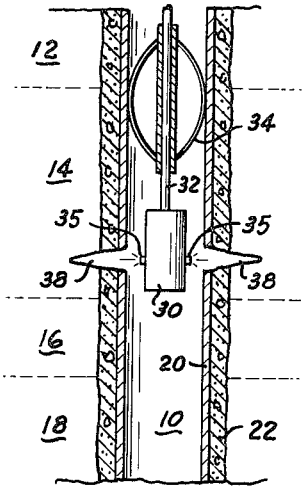
Figure 5:
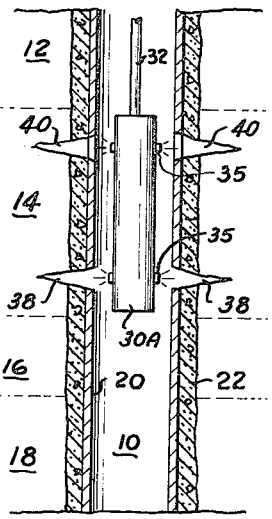
Figure 6:
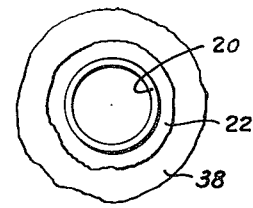
FIGURE 6 is a schematic representation of a horizontal section taken along line 6—6 of FIGURE 2.

Referring now to FIGURES 1 through 7, and to FIGURES 1 and 6 in particular, a cased well bore 10 is shown as extending through a plurality of geological strata representative of the earth's structure in oil-containing areas. It is to be understood that the geological structure shown is representative only and is employed for the purpose of explaining the invention, rather than limiting the invention strictly to treatment of the identical geological structure. In the drawing, the various strata from the top down, as shown, are: A limestone 12, an oil sand 14, a calcareous sand or shale 16, and a water sand 18. The present invention is principally concerned with operations in the oil sand. The cased well 10 comprises a carbon steel casing 20 that is set or mounted in a layer of well cement 22 that defines a continuous elongated annulus around the casing and serves to bond the casing to such part of the formation as is horizontally adjacent to the casing.

An oil-bearing formation such as the oil sand 14 is selected as the zone to be treated. It will be appreciated, however, that gas and water formations may also be so treated. Then, at least one depth, 7—7 is selected as that where the treating fluid is to be introduced into the formation at a desired zone of entrance. Following the establishment of 7—7, a depth or level beneath that, but still in the same oil sand or producing formation 14 is selected. The latter depth is denoted as 6—6 and is the depth at which the sealing cavity is formed to form the seal or means for confining in accordance with the present invention.

Following the selections of 7—7 and 6—6, a cutting tool 30 is run down through the casing to the level of 6—6. The tool 30 is ordinarily suspended at the bottom of a string of tubing or drill pipe 32. Additional support to aid in centrally disposing the tool 30, is derived from a centralizer 34 which is attached to the tubing 32. For the purpose of this description, it is assumed that conventional drilling equipment and accessories therefor is provided. Such equipment is described in "Petroleum Production Engineering" (4th ed.), by Lester C. Uren, vol. 1—Development, McGraw-Hill Book Co., Inc., New York, N.Y., 1956.

In the preferred embodiment, the tool 30 comprises a means for emitting a stream of abrasive particles carried in a fluid vehicle. The fluid is preferably water or oil. A description of such a tool and its operation is found in U.S. Patent No. 2,315,496, issued April 6, 1943 to A. Boynton, the U.S. Patent No. 2,302,567 issued November 17, 1942 to F. E. O'Neill, and is further described in the June 15, 1959 and May 9, 1960 issues of the "Oil and Gas Journal" in the articles beginning on pages 68 and 127, respectively. The abrasive stream is led to the tool 30 through the tubing string 32 which is in turn connected at the earth's surface to a suitable pump and supply source for the cutting fluid (not shown). As the stream of cutting fluid 36 emerges from each nozzle 35 of the tool 30, it impinges against the casing 20, abrades the same and removes it, and then continues to abrade the well cement 22 and finally begins to abrade the oil sand or adjacent formation 14 to ultimately form a sand seal cavity denoted as 38. By rotating the tubing 32, the tool 30 cuts throughout a 360° arc thereby severing the casing and cement. The sealing cavity per se is annular with respect to the region formerly occupied by the removed portions of the casing and cement, as seen in FIGURE 6.

Other cutting means can be employed. For example, an expandable mill or cutting bit could be lowered to 6—6 and rotated until an appropriate cut had been made through the casing, cement, and into the oil sand. Alternatively, it is possible to use an oxy-acetylene cutting flame to cut through both the steel and the concrete. Other types of cutting flames are also capable of employment. The 1960 Oil and Gas Journal, supra, describes various flame-cutting and other procedures which are adaptable for employment here. Also, various perforating techniques are available to accomplish the necessary cut.

In the ordinary operation, it is preferred to completely sever the casing 20 and cement 22 throughout a 360° circular arc. In this fashion, provision is made for an annular sealing cavity 38 to receive and provide an annular seal in the manner described below. In unusual situations, it may be desired to only sever a portion of the casing and the cement. Complete severance or cutting throughout 360° is obtained by the provision of a plurality of streams 36, or by rotating the cutting tool 30, or by a combination of the two.

Figure 2:
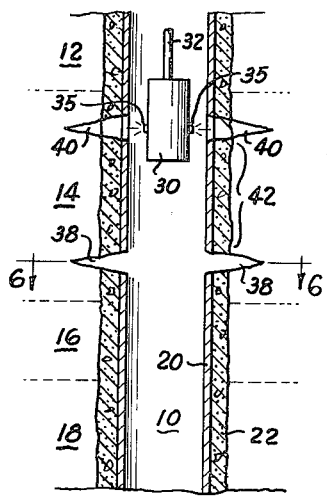

Referring now to FIGURE 2, the tool 30 is next moved up to the well to the 7—7 level and suspended there by the tubing and centralizer in an appropriate position. A treating cavity or zone of entrance 40 is prepared by again directing a stream 36 of cutting particles against the casing, the cement, and finally into the producing formation 14. This process is generally similar to that for forming the sealing cavity 38.

Figure 7:
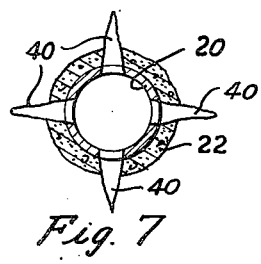
FIGURE 7 is a schematic representation of a horizontal section taken along line 7—7 of FIGURE 3.

It is preferred to form a treating cavity or zone of entrance by complete severance in a fashion similar to that of 38. However, in some instances there is great danger that the intermediate section of casing and cement 42 may slip and fall down into the sealing cavity 38, thereby to block the same from future operations. In such instances, it is preferred not to make a complete 360° cut, but instead to hold the tool 30 still and to perforate the casing only at preselected points around the periphery thereof. In this fashion, there is some vertical support for the intermediate section 42. Thus, the cross section presented by FIGURE 7 represents another embodiment of the zone of entrance at the fracturing cavity 40 as being peripherally discontinuous of the cement and casing. Alternatively, the sand plug, or bed of pressure responsive flowable plugging material of FIGURE 3, below, can be emplaced prior to establishing the cavity 40, thereby to lend some supoprt from underneath. It may be desirable and it is certainly an alternative, to prepare the cavities 38 and 40 in reverse of the order just given.

Figure 3:
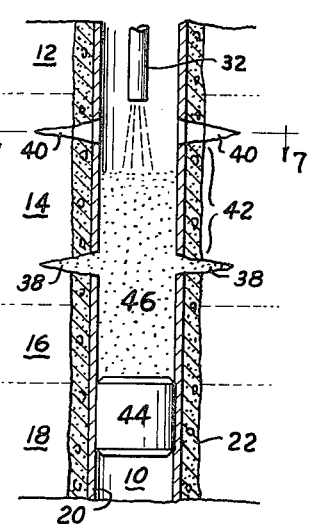
Figure 4:
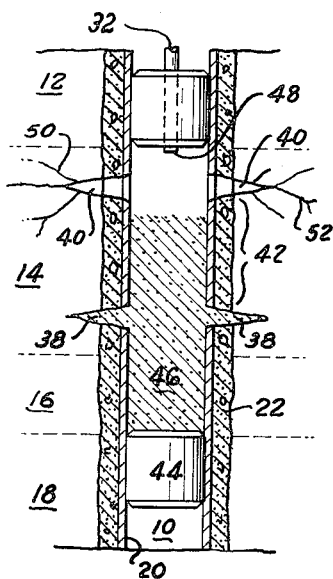

Referring now to FIGURE 3, the next sequence of steps involves placing a plug or bridge 44 at some point in the casing beneath 6—6. It is preferred that the plug be drillable so that it can be removed to provide access to regions of greater depth. Accordingly, a drillable assembly such as that described on pages 475–477 of Uren, supra, may be employed. Of course, other drillable bridging assemblies can be used. In using an apparatus such as described by Uren, it is contemplated that the bridge will be completely sealed with no through passages when seated in the well and therefore the appropriate sealing means can be inserted in the plug prior to its insertion in the well.

The bridge 44 is run into place by attaching it to the end of the tubing 32, lowering it to the proper depth, and then exerting a sufficient pressure of water or the like to cause the slips (not shown) to engage the casing in a positive mechanical manner. After the bridge 44 is seated, the tubing or drill stem 32 is disconnected therefrom and moved upwardly to approximately the position shown in FIGURE 3. Then a pumpable slurry of sand and oil, or sand, cement and water or other suitable material is pumped down through the drill stem until the casing 20 above the bridge 44 is filled with the plugging agent to a level intermediate to cavities 38 and 40, i.e. to a level along the intermediate casing in cement section 42. If desired, sand can be mixed with petroleum or some hydro-carbon derivative in order to provide the pumpable slurry.

It is important that the treatment not be performed until the depth of the plugging agent is accurately determined and maintained at a point immediately below the cavity 7—7 and above the cavity 6—6. This may be done by mechanically sampling the top level of the plugging agent, this technique being more commonly known as "thiefing."

Thereafter the treating fluid is pressured into the drill stem 32 and pumped under pressure down through the well, through the passage 48 and finally out through the zone of entrance to the fracturing cavity 40 into the formation 14.

Treatment may also be accomplished with the drill stem 32 removed from the well, and the fluid injected directly down the casing string.

Great pressure is exerted on the formation in fracturing. A consequence of applying the pressure of the fluid, which is preferably an oil, an oil-water emulsion, or the like, is to cause fractures in the oil sand 14 which in turn constitute drain channels, denoted herein as the cracks 50. These cracks appear in random fashion according to the nature of the oil sand or other oil-bearing formation 14. At the same time that pressure is being applied to fracture the formation, the same pressure urges the plug 46 into place and causes a flow of the plugging material out and into the plugging cavity 38. Thus, as long as treating and hydro-static pressure exceeds the formation pressure, there is a force that urges the plug 46 out into sealing or confining engagement with the formation in the annular cavity 38. This urging is constant and continuous during the application of pressure and provides the annular seal as best seen in FIGURE 6. This annular seal opposes the flow of fracturing or treating fluid down through channels that may be present due to faults in the cement casing or formation to cement bond. Standard completion procedures and techniques are then employed.

FIGURE 5 shows an alternative technique for creating the two cavities 38 and 40. The process of FIGURE 5 involves the use of a tool 30a which is generally similar to the tool 30 of FIGURES 1–4. However, the tool 30a has groups of nozzles 35 vertically spaced apart, each group of nozzles being located at the proper level 6 or 7 when the tubing or drill stem 32 is properly positioned within the well. When the abrasive fluid is pumped out through the nozzles, the two cavities are formed generally simultaneously. The apparatus in FIGURE 5 is most conveniently used when it is desired to have both the fracturing and the sealing cavities 38 and 40 of like conformation, that is, to have them both either completely annular which is obtained by rotating the tool 30a within the casing, or where it is desired to have only a perforation in the casing in which case the tool 30a is held still. A similar arrangement could conveniently be used with a cutting flame.

A wide variety of materials are suitable for use as a plugging agent in filling up the annular sealing cavity. Included in the term "plugging agent" are: A gel, preferably one that can be formed in situ and which is stable but can be broken by contacting with a suitable gel-breaker or solvent; particulate materials such as sand, cellophane in divided form, cottonseed hulls, wood fibre, ground corn cobs, a combination of any of the same, and on occasion cementitious materials admixed with one or a combination of the same; and where nondissolvable solids such as some of those listed as particulate materials are used, it is preferred that the plugging agent include a suitable fluid vehicle for carrying the same down to the appropriate place in the well. When the term "plugging agent" is used below, it is intended to include materials such as those generally described in the preceding listing, but not limited thereto. Further, when the term "particulate material" or the like is employed below, it is intended to refer to such items as sand, etc. as cited above, but without a limitation to only those materials recited in the listing. It is preferable that the plugging agent (which includes particulate materials) be of such a fluid-like nature that it may be flowed into confining relation with the formation whereby the flow or channeling of fluids is prevented past the seal that is accomplished by installing the plugging agent in the annular or sealing cavity.

It is preferred that the invention be applied to the treatment of oil-bearing formations by such means as fracturing, acidizing and the like wherein fluids are utilized that may channel into the wrong place. However, other types of formations, including those containing gas or water (ordinarily salt water as found in association with petroleum minerals) can also be treated. Treatment of water-bearing formations is sometimes desired in order to provide fluid for use in water flooding operations, the preparation of drilling mud, and the like.

The method has been described with reference to a preferred embodiment wherein the annular plug is installed at a position beneath that where the perforation into the formation is accomplished. It is also practicable to emplace the seal above the zone of treatment, e.g. where there may be a fluid contained in the formation that would interfere with either the treating process contemplated or with subsequent producing operations from the formation once it has been treated. It is further contemplated in this connection that seals be emplaced above and below the zone that is to be treated by the various means described herein.

Where the seal is placed above the treated zone, it is ordinarily preferred to pressurize it into confining relation with that formation being treated. One way of accomplishing this is to isolate the seal by seating a packer above the bed of "plugging agent," then to fill the zone above the isolated seal with fluid, and then to pressurize both the seal zone and the treated zone.

Figure 8:
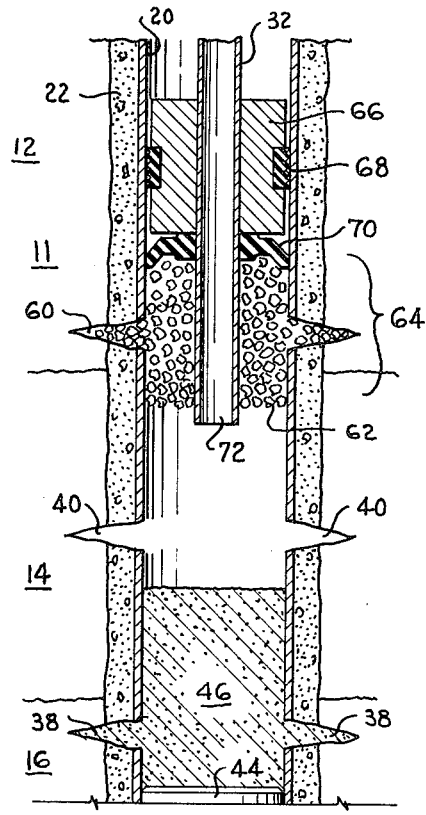
FIGURE 8 is a schematic representation of a well cross section illustrating one manner of carrying out the present invention.
Figure 9:
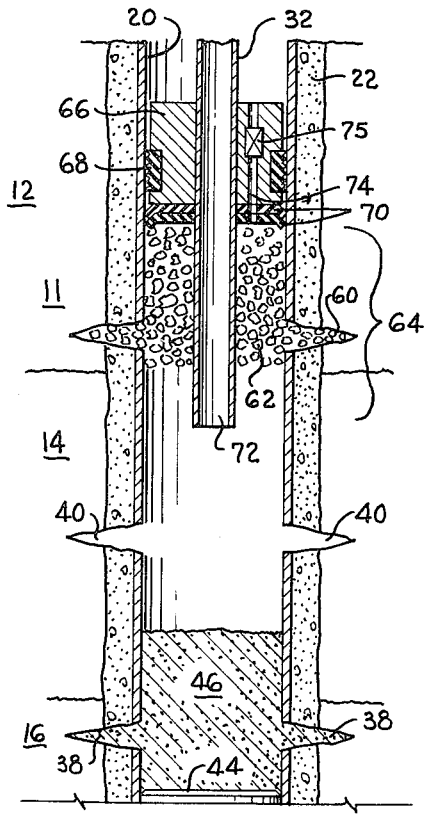
FIGURE 9 is a schematic well cross section illustrating another manner of practicing the invention.
Figure 10:
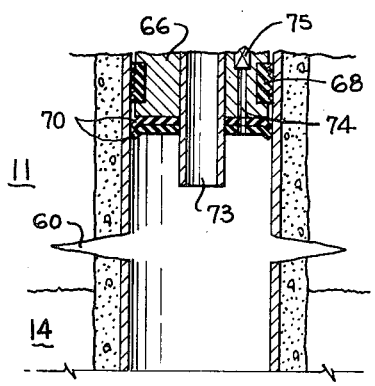
FIGURE 10 is a schematic well cross section of a modification of FIGURE 9.

FIGURES 8, 9 and 10 show procedures for establishing a seal above the treated zone. In these figures a floating "plugging agent" is used. The level of the "plugging agent" is obtained by seating a packer and suitable sealing means above the floating mass. The sealing effect is obtained by the pressure applied in treating the formations as by fracturing, acidizing, and the like.

Referring now to FIGURE 8, there is shown a well cross section having an oil-bearing zone 14 that is to be treated by fracturing through the fracturing cavity 40. Overlying the zone 14 is a stratum 11 which contains water or salt water and which it is desired to seal off by establishing an upper sealing cavity 60. The perforation of the casing 20, the cement 22 and the stratum 11 is preferably obtained in the fashion set forth above for the lower sealing cavity 38 and the fracturing cavity 40. A complete annular cut presenting a cross section as in FIG- URE 6 is preferred, but a cross section such as shown in FIGURE 7, can be employed where structural reasons demand it.

When the sealing cavity 60 has been prepared, a plug or bridge 44 is seated below the lower sealing cavity 38 in the fashion described above. Even if a lower sealing cavity 38 is not to be established, it is still desired to use the plug 44 unless the operation is immediately adjacent the bottom of the bore hole because it will be necessary to properly isolate the treating zone. Following this, the plug 46 is emplaced.

Most well casings are filled with fluid during such operations, for example, fracturing fluid, water, or the like. Assuming such to be the case, a large amount of floating material 62 is introduced at the top of the well where it floats on top of such fluid. The quantity of the floating material is sufficient that it fills the interval denoted as 64 in FIGURE 8 when the body of material is ultimately positioned. The interval 64 extends downwardly from a packer assembly to a point intermediate the upper sealing cavity 60 and the fracturing cavity 40. The tubing string is then assembled and includes a packer or bridge assembly 66 having selectively controllable slips 68 which can be jammed into engagement with the casing 20 and withdrawn from such engagement upon suitable manipulation by the operator. Immediately below the packer assembly is positioned a one-way seal cup 70. A tail pipe of tubing 72 depends below the assembly of elements 66, 68, 70 and is long enough to extend completely through the body of floating material into the liquid below.

When the tubing string 32 has been assembled to include elements 66, 68, 70 and 72, it is then positioned in the casing 20 and started down through the well. As this assembly is moved down through the well, the liquid within the casing enters the tail pipe 72 and runs up through the tubing 32. If desired, the packer 66 can have suitable by-pass valves constructed within it so that the liquid is merely transmitted from underneath the assembly of elements 66–72 to above such assembly of elements. The particles and materials making up the floating body of material 62 cannot get into the tail pipe 72 because they float on top of the liquid and will not circulate around the bottom of the tail pipe as long as the latter is long enough to depend into the liquid supporting the floating body 62.

The tubing 32 is continued to be run into the well until the proper depth is reached, at which time the slips 68 are actuated and jammed into seating engagement with the casing 20. Thereupon the fracturing operation can commence. Fracturing fluid is pumped down through the tubing 32 and out of the tail pipe 72, through the fracturing cavity 40 and into fracturing contact with the formation 14. The pressure of the fracturing fluid is such that it urges the floating material 62 out into sealing engagement with the cement and formation. The pressure of the fracturing fluid maintains this seal. The floating material is, of course, pressure responsive to the extent that it flows into sealing engagement with the cement and formation in response to the fracturing pressure. Where the circumstances call for it, the tubing and tail pipe may have concentric tubes mounted therein and/or packer 66 may have a by-pass valve unit therein so that liquids originally in the well casing can be displaced from the fracturing region by the fracturing fluid prior to the time fracturing is commenced.

Suitable materials for the body of floating material include: Chopped or finely divided expanded cellular polystyrene such as sold under the trade mark "Styrofoam" and manufactured by the Dow Chemical Company of Midland, Michigan; cellular polyurethane foams, preferably of a medium hard variety that readily permanently deforms under the application of pressure; ground, chopped, or finely divided cork; sawdust; and those materials listed above as being a plugging agent, whenever such materials are of lower specific gravity than the liquid on which they float. The difference in specific gravity should be as large as possible and can be obtained both by increasing the specific gravity of the liquid by the addition of chemicals, etc., by the selection of the materials to comprise the body 62, and even by coating the materials in the body with a waterproofing salt such as aluminum acetate where water is the principal solvent in the fracturing fluid, or by coating the materials with some other suitable solvent-resisting material to the end that absorption of the liquid by the solids making up the floating body will be reduced and thereby maintain the floatability of the materials in the body 62. The liquid is any well-known fracturing fluid such as emulsions of acid and petroleum fractions or of the latter with water; crude oil; napalm gels and the like.

FIGURE 9 illustrates a modification of the embodiment of FIGURE 8 wherein sealing cavities at the upper and lower portions of an interval are sealed at about the same time. To accomplish this, a liquid vehicle is admixed with a plugging agent that will float on top of the liquid or fluid derived therefrom and a plugging agent that will sink in the liquid or a fluid derived therefrom. The mixture is then introduced into the interval to be sealed. The respective plugging agents are freed from entrainment by such techniques as breaking a gel by contacting it for a time with a gel-breaker if the liquid vehicle is a gel, allowing the liquid vehicle to change viscosity merely by the lapse of time, and in some instances, by diluting the liquid vehicle to a lower viscosity by adding a solvent. The particular liquid—which term is here used to include liquid compositions and mixtures, gels, emulsions and the like—is selected according to the type of formation and the character of treatment to be given the formation. The types of liquids are well-known to the prior art and the composition of the liquid vehicle per se constitutes no part of the present invention. However, the use to which such liquid is put in acting as a vehicle for the plugging agent(s) is part of the present invention.

If the formation to be treated is a limestone or dolomite, it is highly desirable to acidize the same as part of the fracturing operation. The liquid vehicle selected for practicing the invention of FIGURE 9 accordingly will include a suitable acid. The liquid vehicle is preferably an acid-kerosene emulsion. One such emulsion is taught in the September 1953 issue of the Petroleum Engineer in the article on pages B–14 through B–18. Hydrochloric acid, a commercial grade of kerosene, a corrosion inhibitor to protect the casing and other metal parts from the acid, an emulsifying agent, and a de-emulsifying agent are all mixed together. Such an emulsion is time-breaking. That is, the emulsion is quite thick but will break down and yield a liquid of much less viscosity after a predetermined length of time. The amount of time involved varies in accordance with the down-hole temperature. The consistency after the emulsion breaks is approximately that of kerosene.

Using a liquid vehicle comprising the acid-kerosene emulsion described above, sand and "Styrofoam" (the latter in finely-divided form) are added to the vehicle and introduced into an interval of the bore hole that has been isolated by packers seated above and below the respective upper and lower sealing cavities. When the interval is completely filled with the mixture of emulsion and plugging agents, it is allowed to remain at rest for some predetermined length of time at the end of which the emulsion will have broken, the sand will have sunk to the bottom of the interval to a position adjacent the lower sealing cavity, and the "Styrofoam" will have risen to the top of the liquid to a position adjacent the upper sealing cavity of the interval. Fracturing operations are now commenced in the usual manner, the hydraulic pressure serving to urge the respective masses of plugging agent into sealing engagement with their sealing cavities. Ordinarily, it would be preferred to introduce additional quantities of the emulsion so that it can flow out into the formation through the fracturing cavity.

In the embodiment of FIGURE 9, the packer assembly 66 does include a by-pass passage 74 and a by-pass valve 75 for controlling fluid flow through the passage. Alternatively, concentric pipes with suitable check valving therein may be employed in the tubing string 32. The packer 66 is positioned in the well and the liquid vehicle plus plugging agent (floating and sinking) is introduced as by pumping down through the tube 32 into the region below the packer assembly 66. The by-pass valve 75 is open during this time so that other fluids are displaced from this region. When the displacement has been completed, the valve 75 is closed and the gel is continued to be forced into the region between the lower plug 44 and the packer until such time as the entire region has been filled with the mixture. Catalyst for breaking the gel is frequently mixed with the liquid vehicle if the latter is a gel. When the catalyst operates, the vehicle changes viscosity which falls to the bottom forming the sand plug 46, and the floating particles which then rise to the top of the system where they congregate to form a floating body of material 62.

The pressuring operation commences, the various materials comprising the sealing plugs for the sealing cavities are urged into place and the fracturing fluid, preferably including a gel-breaker or being a time-breaking gel or emulsion, through pipe 32 from whence it flows out through the cavity 40 into the formation 14.

Various techniques may be employed for determining the location of the floating bed in the well. One is by keeping a careful log of the well so the position of the various sealing cavities and fracture cavities are known. Using such a log, and knowing the amount of space a particular amount of sealing material will take up in the well casing, appropriate volumes of plugging agents can be introduced into the well casing. Alternatively, radioactive particles can be admixed with the various plugging agents and the radiation level measured within the well to determine exactly where the plugging agent is and to what level it extends.

The packer assembly 66 with its attendant seal cups 70 should be disposed approximately two feet above the intended zone of fracture, i.e. two feet above the upper side of the oil-bearing stratum 14. The upper sealing cavity 60 is disposed at an appropriate point between the fracturing cavity 40 and the position of the packer assembly 66. In most cases the upper sealing cavity will be located quite close to the boundary between the stratum 14 and the stratum 11. In some cases it may be necessary to place the upper sealing cavity in the oil-bearing stratum 14. In other instances, as illustrated in FIGURES 8 and 9, the situation may require the upper sealing cavity to be located in the upper of the various strata under discussion. The tail pipe 72 should extend to some place below the boundary of the floating body and preferably should be somewhere between the lower bottom of the floating body 62 and the sand plug 46.

FIGURE 10, which is an alternative embodiment of the invention shown in FIGURE 9, shows an embodiment wherein a shortened tail pipe 73 is used with the packer assembly 66 in the embodiment of FIGURE 9. The shortened tail pipe is advantageous in using the gel mixture because it introduces the gel-breaker into intimate contact with the mixture closely adjacent to the top whereby the floating particles can be readily washed free of the associated materials which might tend to retain them in the gel and prevent flotation. Use of the shorter tail pipe also facilitates handling. Once the seal in the upper cavity 60 has been established by applying pressure, the gel mixture is changed to the ordinary fracturing mixture that may include napalm, sand and crude oil. Continued pumping of the fracturing fluid will cause a channel through the body of floating material 62 and out through the fracturing cavity 40 into intimate and fracturing contact with the formation.

Example

A Tar Spring Sandstone traversed by a five-inch I.D. casing was treated for fracturing, the fracture cavity being at 1347 feet and the sealing cavity at 1353 feet, the latter two distances being measured from the earth's surface. The cutting tool was lowered into the well on cable tool apparatus. A sand and water mixture was employed for cutting, being delivered through a two-inch tubing at 17 barrels per minute and a discharge pressure of 3,000 lbs. per square inch. Operating under these conditions, the sealing cavity was formed in fifteen minutes and the fracturing cavity was formed in thirty minutes. The plug was a mixture of moth balls, sand, and a commercially available gelled acid. The formation was fractured using 320 barrels of fracturing fluid delivered at pressures in the range extending from 1650 to 1800 lbs. per square inch. The fracturing fluid was delivered over an eighteen-minute period of time. The composition of the fracturing fluid was one pound of sand per gallon of salt water. The salt water was such as is found in association with petroleum minerals in the vicinity.

Swabbing at fifteen barrels per hour after fracturing lowered the fluid level steadily to the producing zone with increasing show of oil being encountered in the swabbing fluid, thereby indicating successful fracture of the oil-bearing zone.

The foregoing example demonstrates an actual successful application of the subject method. The example also illustrates the feature of prior prophylactic action which produces the result of minimal loss of fracturing fluid and fracturing fluid pressure in the treatment of the formation.

Under some present procedures for treating formations, it is known to shatter and/or crack the cement surrounding the casing and to perforate the casing at one or more points. The shattering of the cement is on such occasions desired in order that the fluid to be withdrawn from the surrounding stratum is filtered by its passage through the shattered cement, thereby removing sand and the like from such fluid. The present invention further contemplates that the cement be suitably shattered and cracked, the casing perforated, and that a suitable washing action be applied by directing the abrading stream through the casing perforations against the cement in such a fashion as to wash away the cement while leaving some portions of the casing in place. In this fashion, a suitable sealing cavity can be formed throughout a 360° arc while portions of the casing are left in place. Alternatively, the cement can be removed by acidizing after being shattered. In such case the acid has an inhibitor admixed therewith to protect the casing from corrosion as much as possible. The annular cavity can be formed in the formation after the acidizing has removed most of the cement.

In some instances it may not be essential that a bridge be emplaced prior to establishing the bed of "plugging agent," e.g. where operations are near the bottom of the well. In such instances the plugging agent is passed into the well until the bottom of the hole and the sealing cavity are filled up.

In review it is seen that the invention includes a novel method of disposing a seal in such a fashion that channeling of treating fluids is confined to the oil sand or desired producing formation. In addition, the force opposed to the channeling is proportional to that applied because of the employment of treating pressure to seat the seal in the annulus or other cavity 38. Moreover, the seal can be readily emplaced prior to commencing the treating operation, whereby problems of water displacement, loss of treating fluid and other problems attributable to the channeling of the treating fluid along the casing-cement and/or the cement-formation bond. The employment of abrasive cutting is preferred because sand can be used as the abrading element. The invention is not restricted to such cutting.

While the invention has been described with respect to certain specific apparatus, geological formations and the like, it is to be understood that the structures referred to are no limitation upon the invention, and that included within the invention are all the modifications, substitutions or equivalents, and the like which would be obvious to one skilled in the art having this disclosure before him.

I claim:

1. A method of treating a geological formation adjacent to a casing-and-cement well structure to prevent channeling during pressure fluid treatment of the formation, comprising the steps of removing an annular area of casing and cement to form a sealing zone, removing at least a portion of the casing and cement at an annular position beneath the sealing zone thereby forming a treating zone, both zones permitting open communication between the interior of the casing and the formation; introducing into the casing a body of material including a liquid and particles of less specific gravity than the liquid; positioning a removable casing plug above the body of material previously introduced and moving the plug with the body of material ahead of it through the casing to a position adjacent the upper one of the two zones at a location such that the floating particles will extend from said plug down to a place intermediate the two zones; and treating the formation by directing a liquid under pressure into a region common to the two zones whereby the pressure of the liquid urges the floating materials into the upper of said two zones for sealing engagement with the formation to seal against channeling of water and treating liquid beyond the sealing zone.

2. A method according to claim 1 wherein the step of positioning the plug includes providing a path for treating fluid through the plug and the body of floating material and into the space occupied by the liquid supporting the floating material.

3. A method of treating a geological formation adjacent a casing-and-cement well structure to prevent channeling during pressure fluid treatment, comprising the steps of establishing communication between the formation and the inside of the casing by forming a first communicating cement-free zone between the formation and an internal portion of the casing, forming a second communicating cement-free zone above the first communicating zone, introducing into the casing a body of liquid having floating thereupon a mass of "plugging agent," and positioning the "plugging agent" at a location within the casing that traverses the second communicating zone, establishing a sealing means within the casing above the floating mass of material, and introducing a treating fluid under pressure into the casing beneath the "plugging agent" and into the first communicating zone and thence under pressure into the formation for treatment by the treating fluid, the floating mass of material being urged by the pressure of the treating fluid into engagement with the sealing means and into engagement with the formation adjacent the second communicating zone thereby preventing the treating fluid from channeling upward through the sealing means.

4. A method in accordance with claim 3 wherein at least one of the steps of forming a communicating zone includes the step of establishing a 360° annular cut extending through the casing, the cement and into the formation.

5. A method in accordance with claim 3, wherein the "plugging agent" is taken from a group consisting of finely divided expanded cellular polystyrene, finely divided cellular polystyrene foam, finely divided cork, and finely divided substantially solid material treated with a solvent-resistant material to reduce absorption of the liquid by the solid material.

6. A method of treating an oil-bearing formation to prevent channeling adjacent a casing-and-cement well structure to prevent channeling while pressure fluid treatment is made, comprising the steps of removing a portion of the casing and adjacent cement thereby establishing communication with said formation from the inside of the casing and through the cement at a preselected depth in the well adjacent said formation, thereby to form a fracturing cavity; establishing communication with said formation from the inside of the casing and through the cement by completely removing an annular ring of the same at a second preselected depth in the well to form a sealing cavity in said formation, said second preselected depth being greater than the first said preselected depth; plugging the casing below said sealing cavity; introducing a bed of flowable "particulate material" extending from the point of plugging upwardly to a depth intermediate said fracturing cavity and said sealing cavity, a portion of said bed being disposed within said sealing cavity and flowable into confining relationship with said formation responsive to pressure applied thereto; and applying a fracturing fluid under pressure to said bed and through said fracturing cavity to said formation thereby to urge the flowable material in said bed into confining relation with said formation in the region of said sealing cavity and to fracture said formation in the region of said fracturing cavity whereby the fracturing fluid is prevented by the sealing cavity and its sealing fluid from channeling into water bearing or other deleterious formations.

7. A method of treating an oil-bearing formation adjacent a casing-and-cement well structure to prevent channeling, comprising the steps of establishing communication with said formation from the inside of the casing and through the cement at a preselected depth in the well adjacent said formation by removing a portion of the casing and adjacent cement, thereby to form a treating cavity; establishing communication with said formation from the inside of the casing by removing the same and through the cement through an arc of 360 degrees at a second preselected depth in the well to form an annular sealing cavity in said formation, said second preselected depth being greater than the first said preselected depth; plugging the casing below said annular sealing cavity; introducing a bed of flowable "particulate material" extending from the point of plugging upwardly to a depth intermediate said treating cavity and said annular sealing cavity, a portion of said bed being disposed within said annular sealing cavity and flowable into confining relationship with said formation responsive to pressure applied thereto; and applying a treating fluid under pressure to said bed and through said fracturing cavity to said formation thereby to urge the said bed into confining relation with said formation in the region of said annular sealing cavity and to treat said formation in the region of said treating cavity whereby the seal acts to prevent a channeling of the treating fluid.

8. A method of treating an oil-bearing formation adjacent a casing-and-cement well structure to prevent channeling, comprising the steps of establishing communication with said formation from the inside of the casing and through the cement at a preselected depth in the well by removing an annular portion of said casing and adjacent cement to form a sealing cavity in said formation; thereafter establishing communication with said formation from the inside of the casing and through the cement at second preselected depth in the well adjacent said formation by removing at least a portion of said casing and adjacent cement, thereby to form a treating cavity; said another preselected depth being less than the first said preselected depth; plugging the casing below said sealing cavity; introducing a bed of "plugging agent" extending from the point of plugging upwardly to a depth intermediate said treating cavity and said sealing cavity, a portion of said bed being disposed within said sealing cavity and flowable into confining relationship with said formation responsive to pressure applied thereto; and applying a treating fluid under pressure to said bed and through said treating cavity to said formation thereby to urge the "plugging agent" in said bed into confining relation with said formation and to treat said formation in the region of said treating cavity, the "plugging agent" serving to prevent channeling through the sealing cavity and thence to water bearing formations.

9. A method of treating a producing formation adjacent a casing-and-cement well structure to prevent channeling, comprising the steps of severing the cement at a preselected depth in the well, establishing communication between the inner portion of the casing and the severed cement portion by removing a portion of the adjacent casing, thereby forming an annular sealing cavity; removing at least a portion of the casing and adjacent cement in the producing formation in spaced relation with the annular sealing cavity; filling the annular sealing cavity with a plugging agent, treating the producing formation with a fluid, the plugging agent within the annular sealing cavity serving to prevent a migration of the treating fluid into areas beyond the sealing cavity by channeling into water producing formations through a rupture in the cement-formation bond.

10. A method of treating a producing formation adjacent a casing-and-cement well structure to prevent channeling during pressure fluid treatment into adjacent water bearing formations, comprising the steps of establishing communication with said formation from the inside of the casing through the cement at at least two preselected depths in the well adjacent said formation by removing a portion of the casing and all of the adjacent cement, thereby to form a treating cavity and a sealing cavity; introducing a bed of "plugging agent" to fill said sealing cavity, a portion of said bed being disposed within said sealing cavity and flowable into confining relationship with said formation responsive to pressure applied thereto; introducing a treating fluid adjacent the treating cavity; and applying a pressure to said bed and treating fluid through said fracturing cavity to said formation thereby to urge the "plugging agent" in said sealing cavity into confining relation with said formation in the region of said sealing cavity to prevent the channeling of pressure fluids into adjacent water bearing formations.

11. A method according to claim 10 wherein both said cavities are concurrently established.

12. A method according to claim 10 wherein said step of establishing communication forms said treating cavity first.

13. A method according to claim 10 wherein said step of establishing communication forms said sealing cavity first.

14. A method according to claim 10 wherein said step of establishing communication forms said sealing cavity as an annulus extending through an arc of 360 degrees.

15. A method according to claim 10 wherein said step of establishing communication forms said sealing cavity as an annulus extending through an arc of 360 degrees and said "plugging agent" comprises sand.

16. A method according to claim 10 wherein said step of establishing a bed comprises flowing a "particulate material" into the sealing cavity.

17. A method according to claim 10 wherein said step of establishing communication includes flowing a liquid stream containing abrading particles into abrading and eroding contact with said casing, cement, and formation.

18. A method of treating a geological formation adjacent a casing-and-cement well structure, comprising the steps forming a zone of entrance into the formation, forming a sealing cavity above the formation, positioning a sealing means above and adjacent to the sealing cavity, introducing a floating plugging agent into the casing in a quantity calculated to fill the space below the sealing means and covering the sealing cavity, treating the formation with a pressure fluid, the pressure of the fluid serving to fill the sealing cavity with the floating plugging agent while the formation is being treated, the plugging agent thereby blocking any channeling of the treating fluid through the sealing cavity.

References Cited in the file of this patent

UNITED STATES PATENTS

| | | |
|---|---|---|
| 2,368,424 | Reistle | Jan. 30, 1945 |
| 2,805,721 | Maly | Sept. 10, 1957 |
| 2,842,205 | Allen | July 8, 1958 |
| 2,970,645 | Glass | Feb. 7, 1961 |